United States Patent [19]

Stegemann et al.

[11] Patent Number: 5,246,594

[45] Date of Patent: Sep. 21, 1993

[54] PROCESS FOR CONTROLLING THE PH VALUE OF AN ACID SCRUBBING LIQUID

[75] Inventors: Bertold Stegemann, Frankfurt am Main; Günter Kloos, Heusenstamm, both of Fed. Rep. of Germany

[73] Assignee: Metallgesellschaft Aktiengesellschaft, Frankfurt am Main, Fed. Rep. of Germany

[21] Appl. No.: 883,835

[22] Filed: May 15, 1992

[30] Foreign Application Priority Data

May 28, 1991 [DE] Fed. Rep. of Germany ....... 4117382

[51] Int. Cl.$^5$ .............................................. C02F 1/66
[52] U.S. Cl. ...................... 210/743; 55/227; 55/228; 95/9; 95/187
[58] Field of Search ................... 210/743; 55/227, 228, 55/17, 18

[56] References Cited

U.S. PATENT DOCUMENTS

| | | | |
|---|---|---|---|
| 4,329,649 | 5/1982 | Scoates | 324/438 |
| 4,416,855 | 11/1983 | Abrams et al. | 422/111 |
| 4,590,048 | 5/1986 | Spitz | 423/243.06 |
| 4,762,796 | 8/1988 | Weber | 436/55 |
| 4,774,071 | 9/1988 | Gaines et al. | 423/576.6 |

FOREIGN PATENT DOCUMENTS 0237464 1/1987 European Pat. Off. .
0076683 11/1988 European Pat. Off. .
0456042 4/1991 European Pat. Off. .

Primary Examiner—Stanley S. Silverman
Assistant Examiner—Neil M. McCarthy
Attorney, Agent, or Firm—Herbert Dubno

[57] ABSTRACT

The acid scrubbing liquid which has a pH value below 3 and is used in a scrubbing zone to remove acid components from a gas. At least part of the scrubbing liquid is circulated. A partial stream of the scrubbing liquid at a constant rate is mixed with an alkaline solution stream which has a constant concentration and is supplied at a constant volume rate, the pH value of the resulting mixture is continually measured, a setpoint in the range from 5 to 9 is selected for the pH value of the mixture, and a neutral or alkaline correcting liquid is added to the scrubbing liquid in response to a decrease of the measured pH value below said setpoint. The scrubbing liquid may mainly consist of water.

15 Claims, 1 Drawing Sheet

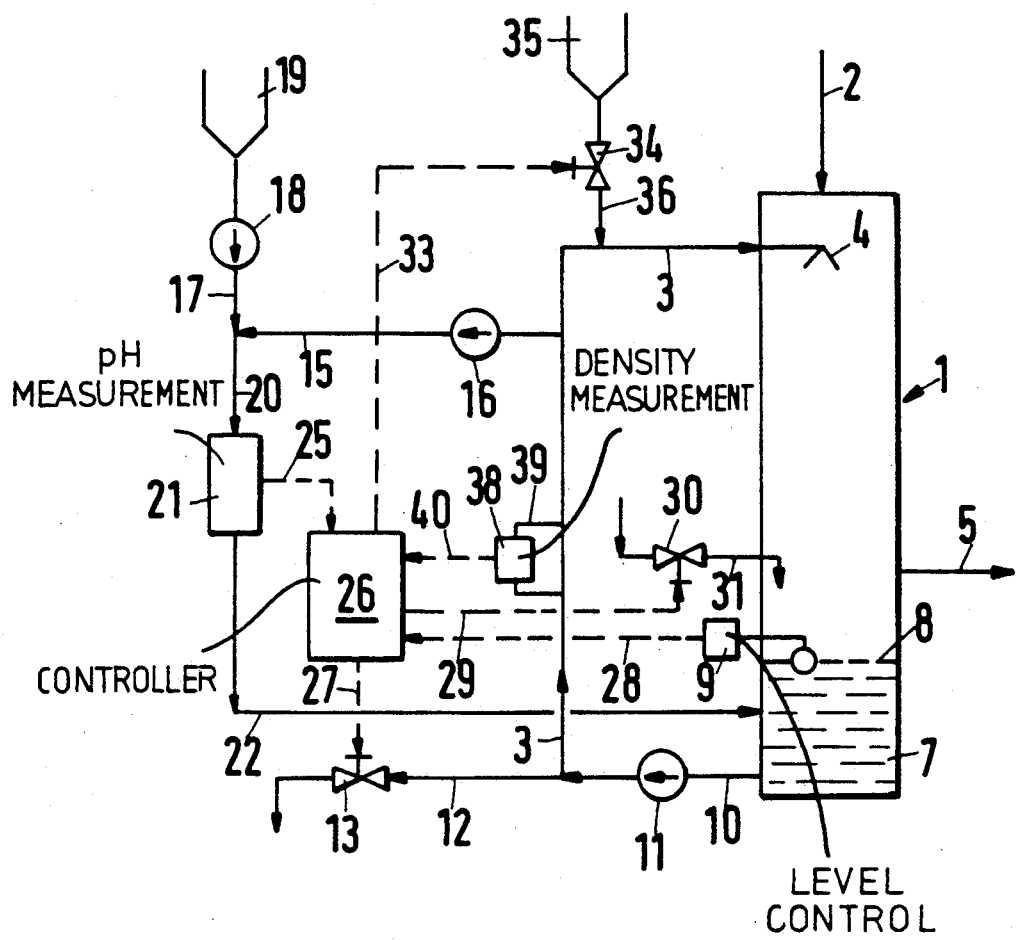

PROCESS FOR CONTROLLING THE PH VALUE OF AN ACID SCRUBBING LIQUID

FIELD OF THE INVENTION

Our present invention relates to the scrubbing of gases with an acid scrubbing liquid and, more particularly, to a process for controlling the pH value of an acid scrubbing liquid, which is used at a pH value below 3 in a scrubbing zone for removing acid components from a gas and is circulated at least in part.

BACKGROUND OF THE INVENTION

European Patent 0 076 683 describes a system which serves to control the pH value of a continuous stream of liquid and in which a pH value analyzer controls the supply of acid or alkaline solution to the liquid in order to maintain a constant pH value.

This known process cannot be used, however, for control of a pH value at such low levels because it does not permit a continual measurement of the pH value of the acid scrubbing liquid for a long time without damage to the sensing element and hence at a low cost.

OBJECTS OF THE INVENTION

It is the principal object of the present invention therefore, to provide an improved scrubbing method whereby the aforementioned drawback is avoided.

Another object is to provide an improved process for measuring pH of a highly acid solution which can be reliably practiced for long periods without detriment and can be effected at low cost.

Yet another object is to provide an improved process for maintaining a substantially constant pH of a scrubbing liquid which to be contacted with a gas to be scrubbed at a pH below 3.

SUMMARY OF THE INVENTION

These objects and other which will become apparent hereinafter are attained, according to the invention, by a scrubbing process which comprises the steps of:

(a) passing a gas through a scrubber into contact with a scrubbing solution at a pH at most 3 and collecting the scrubbing solution following contact of the gas therewith;

(b) recirculating the collected scrubbing solution into contact with the gas;

(c) feeding collected scrubbing solution at a constant rate into admixture with an alkaline solution fed at a constant rate and having a predetermined alkaline concentration to form a mixture having a set point pH in a range of 5 to 9 and feeding the mixture to the scrubbing solution;

(d) continuously measuring a pH of the mixture; and (e) upon a decrease of the pH measured in step (d) adding to the scrubbing solution a liquid capable of raising the pH, thereby restoring pH of the mixture to the set point.

In accordance with the invention, therefore, a partial stream of the scrubbing liquid at a constant rate is mixed with an alkaline solution stream which has a constant concentration and is supplied at a constant volume rate, the pH value of the resulting mixture is continually measured, a setpoint in the range from 5 to 9 is selected for the pH value of the mixture, and a neutral or alkaline correcting liquid is added to the scrubbing liquid in response to a decrease of the measured pH value below said setpoint.

In the process in accordance with the invention the pH value is more or less continuously measured in a liquid which is not aggressive or corrosive or which has a low corrosive power because it has a pH value in the range from 5 to 9, preferably from 6 to 8, e.g., of 7. That action will permit a more accurate pH value measurement and will prolong the life of the measuring means. Besides the sensitivity of the measuring process is increased.

BRIEF DESCRIPTION OF THE DRAWING

The invention will be described in greater detail with reference to the accompanying drawing, the sole FIGURE of which is a flow diagram of the process of the invention, showing the control elements in block-diagram form.

SPECIFIC DESCRIPTION

The gas from which the acid components are to be removed in the scrubbing tower 1 is supplied in line 2. The gas may consist, e.g. of an exhaust gas, which contains, e.g., HCl and HF as acid components. Such an exhaust gas may come, e.g., from a garbage incinerating plant.

The scrubbing tower 1 is supplied through line 3 with a scrubbing liquid, which for the treatment of an exhaust gas from a garbage incinerating plant will mainly consist of water. The scrubbing liquid is sprayed into the gas through one or more distributors 4. Treated gas flows off in line 5 and may be cleaned further if required.

Used scrubbing liquid is collected in the sump 7 of the scrubbing tower 1 up to a liquid level 8, which is maintained by a liquid level controller 9. A part of the scrubbing liquid is recirculated and leaves the tower 1 through line 10 and the circulating pump 11 and a major part of this liquid is recycled through line 3. The scrubbing liquid in line 10 has usually a pH value not in excess of 2. Scrubbing liquid at an adjustable rate is withdrawn through line 12 and the flow control valve 13.

The pH-value of the scrubbing liquid supplied to the scrubbing tower 1 should be maintained constant with only a small deviation. This is accomplished by the following control:

Part of the scrubbing liquid flowing through the line 3 is withdrawn at a constant, relatively low rate through the line 15 and the metering pump 16 and is mixed with an alkaline solution, which is supplied in line 17 from a metering pump 18. The alkaline solution has a constant pH value and consists, e.g., of sodium hydroxide solution, and comes from a storage tank 19. The alkaline solution in line 17 is supplied at a constant volume rate, just as is the liquid in line 15, and is mixed in line 20 with the partial stream of scrubbing liquid.

Care is taken that the liquid which is supplied to the instrument 21 for measuring the pH value has a pH value at a setpoint, which is usually in the range from 5 to 9, preferably from 6 to 8, and, e.g., amounts to 7.

That setpoint is adjusted by a control of the discharge rates of the measuring pumps 16 and 18. The liquid coming from the measuring instrument 21 is supplied in line 22 back to the scrubbing tower 1.

The instrument 21 for measuring the pH value continuously delivers measured-value signals through a signal line 25 to a controller 26. In response to a distinct decrease of the measured pH value below the setpoint the pH value of the scrubbing liquid can be increased in either of two ways. For a small control action, the controller 26 causes via the signal line 27 the valve 13 to be opened for some time so that scrubbing liquid will be removed from the process and the liquid level 8 in the scrubbing tower 1 is thus lowered. This is detected by the liquid level controller 9. That controller 9 delivers corresponding signals via the signal line 28 to the controller 26, which via the signal line 29 causes a valve 30 to be opened, which then causes water to be supplied through line 31 to the sump 7 of the tower 1 for some time until the original liquid level 8 has been restored. The pH value of the scrubbing liquid is increased by this addition of fresh water. For a larger required correction of the pH value the controller 26 causes via the signal line 33 a valve 34 to open, by which an alkaline correcting liquid is withdrawn from a storage tank 35 through line 36 and is admixed to the scrubbing liquid in line 3. That alkaline correcting liquid may consist, e.g., of sodium hydroxide solution.

In the process in accordance with the invention, care is taken to minimize the rate at which the scrubbing liquid is removed from that process through the line 12 and the valve 13. It may also be desirable to monitor the salt content of the scrubbing liquid in line 3. This can be accomplished by a density measuring instrument 38, which is connected to the line 3 by a by-pass line 39 and which acts on the controller 26 via a signal line 40 so that in response to a salt content above a permissible value the controller causes via the signal line 27 the valve 13 to open for a time for a withdrawal of scrubbing liquid. In that case the liquid level controller 9 automatically causes fresh water to be supplied to the scrubbing liquid circuit through the temporarily open valve 30.

The controller 26 may be replaced by visual indicators, which are associated with the instruments 9, 21 and 38 and may induce an operator to actuate the valves 13, 30 and 34 as described. The liquid level controller 9 may alternatively act directly on the valve 30 for permitting a supply of fresh water.

EXAMPLE

A plant in accordance with the drawing is operated as follows. The data have been calculated in part.

Flue gas at 250° C. from a garbage incinerating plant is supplied through line 2 at a rate of 85,000 sm$^3$/h (on a dry basis) (sm$^3$=standard cubic meter=S.T.P.=Standard Temperature and Pressure) and contains 1250 mg HCl/sm$^3$. The scrubbing tower 1 is supplied through line 3 at a rate of 300 m$^3$/h with acid scrubbing water having a pH value of 0.25 and containing 20 g HCl per kg scrubbing water. 90% of the HCl supplied in the flue gas to the scrubbing tower are removed from the flue gas. Scrubbing water at a rate of 4781 kg/h is withdrawn through the line 12 from the scrubbing tower 1, which is supplied through line 31 with 14.230 kg fresh water per hour to replace the water which has been lost by evaporation and is discharged through line 12.

To measure the pH value of the scrubbing water, 40 liters of scrubbing water are branched off per hour through line 15 and are mixed with 2 liters sodium hydroxide solution (30% by weight NaOH) from line 17. As a result, the measuring instrument 21 measures a pH value of 7.

As a result of a sudden change of the composition of the flue gas, only 1000 mg HCl are supplied to the scrubbing tower 1 in the flue gas per hour and the HCl content of the scrubbing water in line 3 is thus decreased to 16 g/l whereas the pH value of the scrubbing water rises to 0.35. The pH value measured by the measuring instrument 21 rises to 13. To decrease that pH value to the setpoint 7, the rate at which scrubbing water is branched off through the valve 13 is decreased to 3825 kg/h and the supply rate of fresh water through line 31 is also decreased.

In an alternative response to the same sudden change of the composition of the flue gas, a compensation may be effected by an addition of sodium hydroxide solution (30% by weight NaOH) through line 36. For that purpose a supply of 165 kg sodium hydroxide solution per hour and a withdrawal of scrubbing water at a rate of 800 kg/h through line 12 will be required and with that the salt content of the scrubbing water in the sump is increased by 120 g per kg scrubbing water. That action will also decrease the pH value measured by the measuring instrument 21 to the setpoint 7.

We claim:

1. A process for scrubbing a gas, comprising said steps of:
    (a) passing a gas through a scrubber into contact with a scrubbing solution having a pH at most 3 and collecting said scrubbing solution following contact of said gas therewith;
    (b) recirculating said collected scrubbing solution into contact with said gas;
    (c) feeding collected scrubbing solution at a constant rate into admixture with an alkaline solution fed at a constant rate and having a predetermined alkaline concentration thereby forming a mixture having a set point pH in a range of from 5 to 9 and feeding said mixture to said scrubbing solution;
    (d) continuously measuring a pH of said mixture; and
    (e) upon a decrease of said pH measured in step (d) from said set point pH adding to said scrubbing solution a liquid capable of raising said pH, thereby restoring pH of said mixture to said set point.

2. The process defined in claim 1 wherein said set point pH range is 6 to 8.

3. The process defined in claim 1 wherein said pH in said set point pH range is about 7.

4. The process defined in claim 1 wherein said liquid is a neutral liquid.

5. The process defined in claim 1 wherein said liquid is an alkaline liquid.

6. The process defined in claim 1 wherein said liquid is added to a sump of said scrubber in which the scrubbing solution is collected in step (a).

7. The process defined in claim 1 wherein a level of the scrubbing solution is maintained constant by the addition of water thereto, a portion of scrubbing solution being discharged in response to said decrease of the pH, thereby restoring pH by said addition of water.

8. The process defined in claim 1 wherein the collected scrubbing solution at a constant rate is withdrawn from the recirculated collected scrubbing solution.

9. The process defined in claim 1 wherein said liquid is added to the recirculated scrubbing solution.

10. A process of controlling the pH value of an acid scrubbing liquid, which is used at a pH value below 3 in a scrubbing zone for removing acid components from a gas and is circulated at least in part, comprising the steps of:

(a) mixing a partial stream of the scrubbing liquid at a constant rate with an alkaline solution stream which has a constant concentration and is supplied at a constant volume rate;
(b) continuously measuring the pH value of the resulting mixture;
(c) maintaining a setpoint in the range from 5 to 9 for the pH value of the mixture; and
(d) adding a neutral or alkaline correcting liquid to the scrubbing liquid in response to a decrease of the measured pH value below said setpoint.

11. The process according to claim 1 wherein the scrubbing liquid consists mainly of water.

12. The process according to claim 1 wherein the pH value of the scrubbing liquid withdrawn from the scrubbing zone is not in excess of 2.

13. The process according to claim 1 wherein the correcting liquid consists of water.

14. The process according to claim 1 wherein a salt content of the scrubbing liquid is measured and in case of an undesirably high salt content, a part of the scrubbing liquid is removed from circulation and replaced by water.

15. The process according to claim 1 wherein the liquid mixture from the means for measuring the pH value is supplied to the scrubbing liquid.

* * * * *